United States Patent
Balachandran et al.

(10) Patent No.: US 7,082,153 B2
(45) Date of Patent: Jul. 25, 2006

(54) VARIABLE SPACING PULSE POSITION MODULATION FOR ULTRA-WIDEBAND COMMUNICATION LINKS

(75) Inventors: Krishna Balachandran, Morganville, NJ (US); Doru Calin, Freehold, NJ (US); Tingfang Ji, Highland Park, NJ (US); Joseph H. Kang, Belle Mead, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 737 days.

(21) Appl. No.: 10/251,954

(22) Filed: Sep. 23, 2002

(65) Prior Publication Data

US 2004/0057500 A1 Mar. 25, 2004

(51) Int. Cl.
*H04B 1/69* (2006.01)
*H04B 7/212* (2006.01)
*H03K 7/04* (2006.01)

(52) U.S. Cl. ............... 375/138; 375/130; 375/239; 370/347; 332/112

(58) Field of Classification Search ............ 375/130, 375/135, 138, 146, 239; 370/213, 337, 347; 332/112
See application file for complete search history.

(56) References Cited

U.S. PATENT DOCUMENTS

| 5,960,031 | A  | * | 9/1999 | Fullerton et al. | 375/130 |
|---|---|---|---|---|---|
| 6,717,992 | B1 | * | 4/2004 | Cowie et al. | 375/316 |
| 6,744,832 | B1 | * | 6/2004 | Miao | 375/349 |
| 6,967,993 | B1 | * | 11/2005 | Miller | 375/150 |
| 2002/0175850 | A1 | * | 11/2002 | Barnes et al. | 342/22 |
| 2004/0057507 | A1 | * | 3/2004 | Rotstein et al. | 375/219 |

* cited by examiner

Primary Examiner—Young T. Tse

(57) ABSTRACT

Methods and systems for generating a variable spacing pulse position modulated (VSPPM) signal for transmission across an ultra-wideband communications channel. The variable pulse position modulated spread spectrum signal is created by encoding every M input data bits from an input data stream into a symbol consisting of $N_c$ chips. Each chip is divided into $2^M$ sub-chips and each sub-chip is further divided into $N_p$ time slots. A pulse is transmitted for each chip in the symbol. During each chip period, the pulse is placed in the sub-chip corresponding to the binary M-tuple (or symbol) value. A time hopping code sequence consisting of $N_c$ elements with a one-to-one chip association is then applied to each symbol so that the position of each pulse is shifted to the appropriate time slot that corresponds to the time hopping code value.

14 Claims, 4 Drawing Sheets

VARIABLE SPACING PULSE POSITION MODULATION FOR ULTRA-WIDEBAND COMMUNICATION LINKS

TECHNICAL FIELD

This invention relates to ultra-wideband communications systems and, more particularly, relates to randomly varying the spacing between pulse position modulated pulses.

BACKGROUND OF THE INVENTION

Ultra-wideband technology has several unique and attractive features, such as immunity to multi-path interference, jamming, and intentional and unintentional interference, low probability of intercept, and enhanced penetration capabilities. Additionally, the elimination of radio frequency (RF) components from the UWB transceivers enables the use of devices with relatively low hardware complexity. Nanosecond pulse durations also make it attractive for application such as precision geo location. As a result, UWB technology is currently being considered for the support of robust, scalable networks that will support a wide range of military and commercial applications in harsh environments (e.g., high multi-path fading, high jamming, and high interference environments).

UWB technology also referred to as impulse, baseband, and zero-carrier technology, uses ultra short pulses, typically less than a nanosecond in duration, to convey information. In the communications context, this property implies that the transmitted signals are highly distorted after bouncing off surrounding objects. Compared with a nano-second pulse duration, the multi-path delay spread is usually of the order of hundreds of nanoseconds.

Since UWB transmitters emit signals at levels below the noise floor, UWB signals have a low probability of detection and a low probability of intercept. Spread spectrum techniques are well suited to extract UWB signals under these circumstances. In spread spectrum techniques, the frequency components of the signal are "spread" across the frequency spectrum by encoding each bit of information in a symbol consisting of a series of "chips" that are transmitted during a symbol period that is allotted for each bit of information.

While the UWB properties described above are desirable for covert communications and help reduce interference, they make it difficult to demodulate and decode the signal. Three binary modulation schemes are often considered for UWB communication. The first scheme is binary antipodal signaling where the polarization of the transmitted pulse is determined by the modulated bit/chip. Thus, the pulse changes state from −1 to +1 depending on the binary value of the modulated bit/chip. Unfortunately, binary antipodal signaling provides adequate performance only when the distortion to the signal is minimal. In addition, adequately resolving the polarization of the received signals is a particularly challenging issue in a high multi-path delay spread environment. Typically, complex receivers are required to resolve the polarization of each pulse, thereby adding to the cost and complexity of the system.

Another modulation scheme considered for UWB communication is on off keying (OOK), where a modulated bit/chip is resolved by determining whether or not the pulse is present. Although OOK modulation is simple to implement for both modulation and demodulation, OOK is vulnerable to additive noise in the channel.

A third modulation scheme that has been considered is pulse position modulation (PPM), which provides more immunity to signal distortion and additive noise. Conventional PPM typically assumes a fixed timing offset between pulses in the signal set. This has several drawbacks for UWB systems. Since the maximum delay of dense multi-path channels are on the order of hundreds of nanoseconds, the spacing of conventional PPM pulses are required to be of the same order of magnitude to minimize inter-pulse interference and maximize the probability of decoding. In TH-CDMA, a large spreading gain and a large number of time bins to hop the modulated signal are employed in conjunction with PPM. As a result, the large PPM modulation pulse spacing can severely limit system throughput.

Therefore, there is a need in the art for a modulation scheme that realizes the benefits of standard pulse position modulation while providing greater immunity to multi-path spreading. In particular, there is a need for a novel pulse position modulation scheme that is more robust to multi-path effects while allowing for a greater throughput in UWB systems than conventional pulse position modulation schemes.

SUMMARY OF THE INVENTION

The present invention meets the needs described above through a pulse position modulation scheme that allows for a greater throughput than conventional pulse position modulation schemes by maximizing pulse separation and randomizing the time offset between pulses in a time-efficient manner. The present invention provides a novel technique, known as Variable Spacing Pulse Position Modulation (VSPPM), which reduces the risk of inter-pulse interference and guarantees a high spectral density and system throughput. Generally described, the invention includes a method for modulating an ultra-wideband communications signal for transmission across a communications channel. A plurality of data bits are received, each data bit having a first value corresponding to the binary value "0" or a second value corresponding to the binary value "1." For each set of M data bits that are received, the VSPPM modulator uses a time hopping code sequence to generate a symbol that consists of $N_c$ chips, where each chip has duration $T_c$ and one pulse is transmitted over each chip. Each chip has $2^M$ sub-chip intervals and each sub-chip interval has $N_p$ time slots, or time bins. The sub-chip interval and time slot in which the pulse resides are determined by the set of M input data bits and a time hopping code sequence value, respectively. The sub-chip interval is chosen based on a predetermined one-to-one mapping between the set of possible M-tuples and the $2^M$ sub-chip intervals. The time hopping code sequence comprises $N_c$ elements with each element taking integer values from 0 to $(N_p-1)$. In general, the time hopping sequence to be used may be chosen from a set of possible time hopping sequences based on the value of the M-tuple (i.e., symbol value). The same hopping sequence may be used for all symbol values (M-tuples) or alternatively, a unique time hopping sequence may be used for each symbol value.

Also described is an ultra-wideband transmitter for transmitting a VSPPM signal. The UWB transmitter includes a transmitter that receives an input signal consisting of a number of binary bits. The transmitter then encodes every M bits of data into a symbol that has a symbol value that falls within the range of 0 to $(2^M-1)$. Each symbol consists of a number of chips, which are transmitted during the symbol period and consist of $2^M$ sub-chip intervals, wherein each sub-chip interval corresponds to at least one symbol value and is divided into $N_p$ time bins. The transmitter then applies at least one time hopping code sequence having $N_c$ elements to each symbol. The transmitter then generates a sequence of $N_c$ pulses in each symbol interval, one for each chip. Each pulse is transmitted in a sub-chip interval determined by the symbol value and in a time bin corresponding to the code value associated with that chip.

The various aspects of the present invention may be more clearly understood and appreciated from a review of the following detailed description of the disclosed embodiments and by reference to the appended drawings and claims.

DETAILED DESCRIPTION OF EMBODIMENTS OF THE INVENTION

Figure 1:
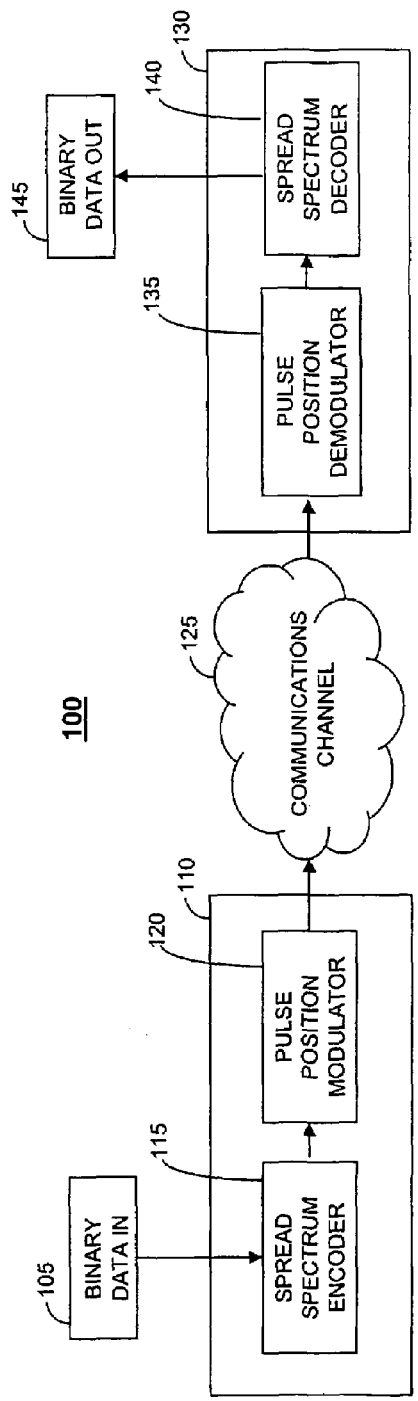
FIG. 1 is a block diagram of an exemplary ultra-wideband (UWB) communications system for implementing a Variable Spacing Pulse Position Modulation (VSPPM) signal.

The present invention is typically embodied in a communications scheme for modulating ultra-wideband (UWB) signals. The present invention is a new modulation technique, called Variable Spacing Pulse Position Modulation (VSPPM), which reduces the risk of inter-pulse interference and guarantees high spectrum efficiency. The VSPPM scheme maximizes the average separation between modulated pulses to achieve greater resistance to large delay spreads. In addition, VSPPM randomizes the time offset between adjacent pulses to provide greater immunity to multiple access interference. As a result, the bandwidth efficiency of UWB communications systems is increased.

The VSPPM scheme can be used to mitigate the effects of channel dispersion in traditional time-hopped code division multiple access systems (TH-CDMA). In a typical TH-CDMA system using conventional pulse position modulation (PPM), the modulated pulse "hops" over a set of $N_p$ positions within each chip of the transmitted symbol. The TH-CDMA signal for the $k^{th}$ user during the $0^{th}$ symbol with traditional PPM is given by the equation $$s_b^k = \sum_{i=1}^{N_c} p(t - \Delta_p - iT_c - c_i^k T_p - b\tau_p), 0 < t < T_s \quad (1)$$

where $T_s$ is the symbol period, $T_c$ is the chip period, $T_p$ is the period of the time slot for the time-hopped code, $\tau_p$ is the separation between pulses, $c_i^k$ is the time hopping code sequence of the $k^{th}$ user and takes values from $\{0, \ldots, (N_p-1)\}$, where $N_p$ is the number of time slots, and b is the value of the information bit taking values $\{0,1\}$ for binary PPM. $\Delta_p$ is a fixed time shift that ranges from zero to one-half the time slot duration minus the pulse duration, and determines the location of the pulse within the time slot. For traditional PPM, $\tau_p$ is typically $T_p/2$, and $\tau_p <= T_p <= T_c <= T_s$. Note that the time shift of the PPM modulator, $\tau_p$, may be a small fraction of the delay spread. Alternatively, the time shift could be increased in value, but increases in time shift lead to proportional decreases in system throughput.

For traditional TH-CDMA with binary PPM modulation, each symbol consists of $N_c$ chips, each chip consists of $N_p$ sub-chips (sub-chip determined by time hop value), and each sub-chip is divided into two positions (position determined by the PPM modulator input). Hence, $\tau_p <= T_p <= T_c <= T_s$. In contrast, VSPPM maximizes the time between PPM-modulated pulses by multiplexing up to $N_p$ users within the PPM modulator time shift. Hence, $T_p <= \tau_p <= T_c <= T_s$. In the exemplary embodiment, $\tau_p$ is equal to $T_c/2^M$, $\Delta_p$ is zero, and p(.) is the transmitted monocycle waveform that nominally begins at time zero on the transmitter's clock with a duration less than or equal to $\tau_p$.

In VSPPM, a series of M bits are encoded into a symbol that takes on a value in the range of 0 to $2^M-1$. Hence in equation (1), b also assumes a value from 0 to $2^M-1$. Each symbol is further divided into a number of chips, $N_c$. Additionally each chip is further divided into $2^M$ sub-chips. Each sub-chip is associated with a particular symbol value. For instance, if each symbol represents three bits of information (M=3), then each chip will contain $2^M=8$ sub-chips. Therefore, if the symbol value is 6 (binary 110), a pulse would be placed in the $7^{th}$ sub-chip interval for each chip of the symbol.

The position of the pulse within each sub-chip is time-hopped to provide a variable spacing between adjacent pulses. The time hopping code sequence values are associated with each chip in sequence. The time hopping code sequence contains $N_c$ elements, each of which have a value in the range of 0 to $(N_p-1)$. The time slots within each sub-chip are indexed from 0 to $(N_p-1)$, and a mapping between time hopping code sequence values and time slot indices is established. In the exemplary embodiment, the first time slot is associated with the value 0, the second time slot is associated with the value 1, and so on until the last time slot is associated with the value $(N_p-1)$. Each pulse is then shifted to the time slot that corresponds to the value of the corresponding code sequence element. Specifically, the pulse in the first chip is shifted to the time slot corresponding to the value of the first element in the code sequence, the pulse in the second chip is shifted to the time slot corresponding to the value of the second element in the code sequence and so forth.

There are several ways in which time hopping code sequences may be applied to the signal. In one method, the same time hopping code sequence may be applied to each symbol, irrespective of the symbol value. Another method is to generate $2^M$ time hopping code sequences and assign a separate time hopping code sequence to each symbol value.

Turning now to the figures, in which like numerals refer to like elements through the several figures, FIG. 1 is a block diagram illustrating an exemplary UWB communications system 100 in accordance with the invention. The UWB communications system 100 contains a transmitter 110, a receiver 130 and a communications channel 125. To generate the VSPPM spread spectrum signal, a stream of binary data in 105, which consist of a stream of binary information bits having a value of either −1 (representing binary "0") or +1 (representing binary "1") is passed to a spread spectrum encoder 115 in the transmitter 110. The spread spectrum encoder encodes every M bits into a symbol consisting of a predefined number of "chips," $N_c$. Each chip is then divided into $2^M$ sub-chips. Each sub-chip is further divided into $N_p$ time slots. A time hopping code sequence that contains $N_c$ elements, each of which has a value in the range from 0 to ($N_p$-1), is applied to each symbol. The time hopping code sequence identifies which sequence of time slots in which the pulses for each symbol should be placed. For example, the value of the first element in the time hopping sequence identifies the time slot for the first chip, the second element in the time hopping sequence identifies the time slot for the second chip, and so forth.

The spread spectrum signal is then passed to a pulse position modulator 120. The pulse position modulator 120 uses the symbol value to determine the appropriate sub-chip. For every M bits of information, the pulse position modulator 120 generates a stream of $N_c$ pulses. The position of each pulse is determined by the value of the M bits and the time hop code sequence. Assuming M=1, $N_c$=4, $N_p$=4, the input bit is 0, and the time hop code sequence is {3, 1, 0, 2}, there will be four pulses, one in each of the four chip periods. All four pulses will be in the sub-chip associated with the value of the input bit (i.e., 0) and their time slot positions will the ones associated with the fourth, second, first, and third values respectively.

The VSPPM signal is transmitted over a communications channel 125. Typically, the communications channel 125 is a wireless radio channel, such as the wireless channel in a cellular communications network. However, those skilled in the art will appreciate that the communications channel 125 may also be an indoor wireless networks. Because UWB technology is relatively immune to multipath effects, UWB communications systems are best suited for indoor use in high clutter environments.

Upon reception of the encoded signal at the UWB receiver 130, the encoded signal is passed through a pulse position demodulator 135. The pulse position demodulator 135 examines the position of each pulse. In a multiple access system, there might be multiple pulses during each chip period. The pulse position demodulator merely outputs all detected pulses without making a decision on the transmitted symbol value.

The demodulated pulse position information is then passed to a spread spectrum decoder 140. Typically, the spread spectrum decoder 140 may be a matched filter that is matched to the characteristics of the time hopping code. An algorithm within the spread spectrum decoder 140 determines the transmitted symbol value based on the peak values at the output of each matched filter. In this manner, the signal can be extracted from the background noise and other interfering signals. Once the signal has been extracted, the spread spectrum decoder 140 recreates the binary signal, which consists of a string of binary bits having the value of 0 or +1 and is transferred out of the receiver 130 as binary data out 145.

Figure 2:
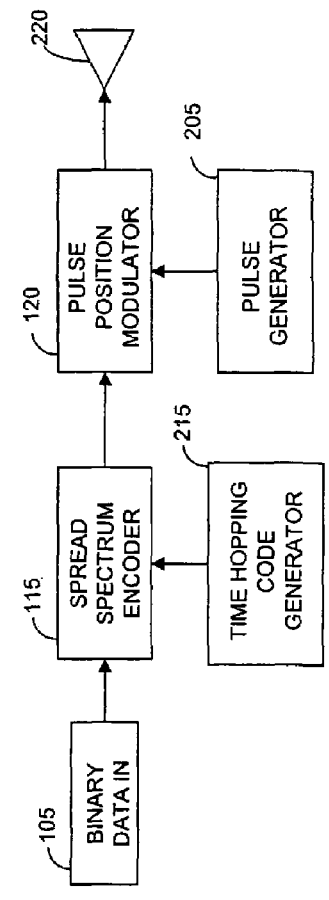
FIG. 2 is a block diagram of an exemplary UWB transmitter for generating a VSPPM signal.

FIG. 2 is a block diagram of an exemplary implementation of a spread spectrum transmitter 110 for generating a VSPPM spread spectrum signal. In the exemplary transmitter 110, the input signal of binary data 105, which consists of a string of binary bits having a value of −1 (representing binary value "0"), or +1 (representing binary value "1"). The binary bits are input to a spread spectrum encoder 115. The spread spectrum encoder 115 encodes every M bits of the binary input data 105 into a symbol. The symbol has a symbol value equal to the decimal equivalent of the sequence of M bits, which is in the range from 0 to ($2^M$-1). Each symbol is divided into $N_c$ "chips," which are transmitted during a symbol period, denoted by $T_s$. Each chip is further divided into $2^M$ sub-chips, each of which corresponds to a particular symbol value. Thus, the first sub-chip corresponds to the symbol value 0, the second sub-chip corresponds to the symbol value 1, and so on until the $2^M$ sub-chip corresponds to the symbol value ($2^M$-1). So for example, if M was set to 8, a particular symbol representing a set of 8 bits with the sequence 01101101 would have the symbol value 109, which corresponds to the $110^{th}$ time slot in each chip of the symbol.

Additionally, each sub-chip is further divided into a predefined number of time slots, $N_p$, where $N_p$ is an integer with value greater than or equal to 1. A time hopping code sequence is received from a time hopping code generator 215. The time hopping code sequence, denoted by $c_1$={$c_1$, $c_2$ . . . $c_{Nc}$} contains $N_c$ elements, which is equal to the number of chips. Each element in the hopping code sequence has a code value in the range from 0 to $N_p$-1. Each time slot corresponds to at least one of the time hopping code values. As a result, the first time slot would correspond to the time-hopping code value 0, the second time slot would correspond to the second time-hopping code value 1, and so on until the $N_p$ time slot corresponds to the time-hopping code value $N_p$-1.

As an example, suppose M=2, $N_c$=8, $N_p$=4, each symbol will have 8 chips, each chip divided into 4 sub-chips and each sub-chip divided into 4 time slots. For a particular sequence of 2 bits of the data input equal to 10 (integer value 2) and an illustrative time hopping code sequence of c={2, 1, 0, 3, 1, 2, 1, 0}, a pulse would be placed in the third time sub-chip for each chip in the symbol. Each pulse is then variably spaced within a particular time slot according to the time hopping code sequence. The time hopping code sequence is applied to each symbol so that the first code value is applied to the first chip, the second code value is applied to the second chip, and so on. Thus, the pulse in the third time sub-chip of the first chip would be placed in the third sub-time slot, which corresponds to the value "2", of the third sub-chip, the pulse in the second chip would be placed in the second sub-time slot of the third sub-chip, which corresponds to the code value "1", the third pulse in the third chip (third sub-chip) would be placed in the first sub-time slot of the third sub-chip, which corresponds to the code value "0", and so on.

In an alternative embodiment, the time hopping code generator 215 provides $2^M$ time hopping code sequences to the spread spectrum encoder 115. Each time hopping code sequence corresponds to one of the $2^M$ symbol values. Each time hopping code sequence contains the same number of elements but have a different sequence of values. Therefore, when multiple access is used the first time hopping code is used to designate the time hopping pattern for the pulses with a symbol value of "0," the second hopping code sequence is used to designate the hopping pattern for the pulses in the symbol having the symbol value "1," and so on.

The output of the spread spectrum encoder 115 includes sub-chip and time slot positions for each of the $N_c$ chips within a symbol. The output of the spread spectrum encoder 115 is then input into a pulse position modulator 120 along with the output of a pulse generator 205. The pulse generator 205 creates a train of pulses at a periodic interval supplied by a timing generator (not shown). The pulse position modulator 120 then modulates the $N_c$ pulses received from the pulse generator 205 with the $N_c$ pulse positions received from the spread spectrum encoder 115. The encoded signal is then sent to a UWB antenna 220, where it is output as encoded binary data to the communications channel 125.

Figure 3:
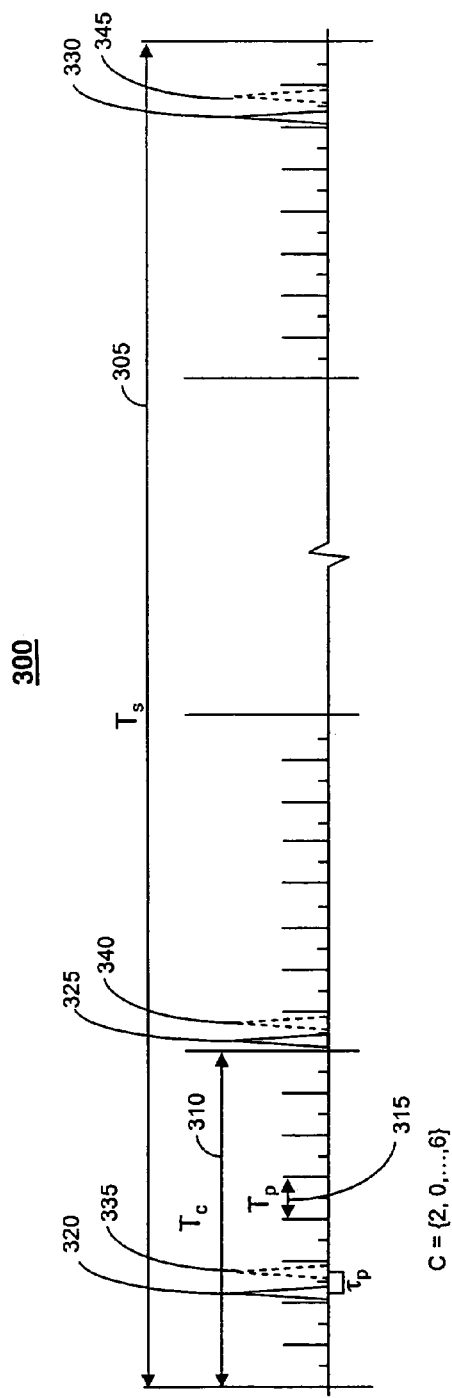
FIG. 3 is a prior art example of a pulse position modulated time-hopped code division multiple access (TH-CDMA) signal.

FIG. 3 is an illustration of a conventional prior art pulse position modulated time hopped spread spectrum signal 300. The spread spectrum signal consists of a series of symbols

305 having a symbol period $T_s$. Each symbol 305, which represents one bit of information, consists of a number of chips 310, denoted $N_c$, and having a period $T_c$. It should be noted that the chip period, $T_c$, is related to the symbol period by the relationship $T_s=N_cT_c$. Each chip is further divided into $N_p$ time slots 315, where $N_p$ is the number of elements in the time hopping code sequence, and each time slot has a period of $T_p$. Pulses are placed in the time slot according to the time hopping sequence denoted by $c=\{c_1, c_2 \ldots c_{Nc}\}$. Each pulse is then modulated using pulse position modulation. The figure illustrates binary pulse position modulation used to modulate the spread spectrum signal. Each signal is shifted in time a distance of either 0 or $\tau_p$ from its initial position to represent the modulated bit. For example, a pulse is transmitted without time shift to represent a binary value of "0" and delayed by an amount $\tau_p$ in time to represent a binary value of "1." Thus all bits that convey the value "1" would be shifted $\tau_p$ in time within each time slot, while pulses that represent a "0" would not be shifted in any time slot. In the figure, pulses 320, 325, and 330 represent a transmitted signal for a binary bit "0", while pulses 335, 340, and 345 represent a signal that would be transmitted if the binary bit has a value of "1".

Figure 4:
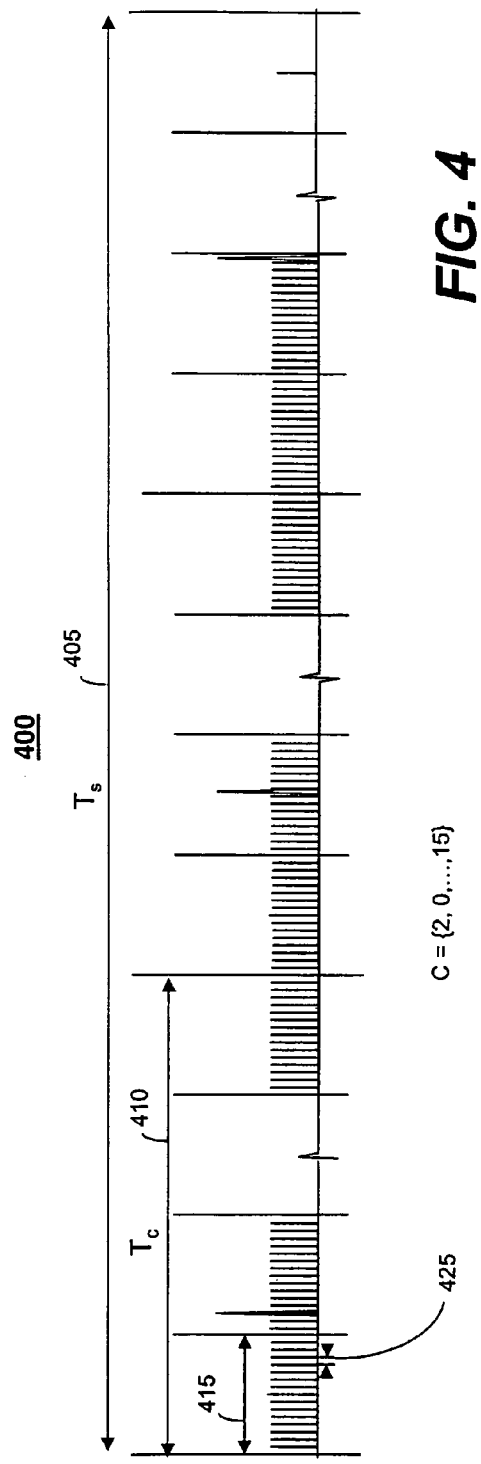
FIG. 4 is an illustrative example of an exemplary VSPPM signal.

FIG. 4 is an illustration of an exemplary signal 400 modulated using Variable Spacing Pulse Position Modulation (VSPPM). The signal 400 consists of a number of symbols 405, having a symbol period Ts. Each symbol 405 represents M bits of binary information and has a value in the range of $0-(2^M-1)$. Each symbol 405 is divided into a number of chips 410, each having a chip duration $T_c$. Each chip 410 contains $2^M$ sub-chips 415, which correspond to the symbol values. For instance, if M=2, then each chip would contain 4 sub-chips, which correspond to the symbol values 0, 1, 2, and 3. Finally, each sub-chip is divided into $N_p$ time slots 425, which correspond to the time hopping code sequence, which in the figure is shown as $c=\{2, 0, \ldots, 15\}$.

Figure 5:
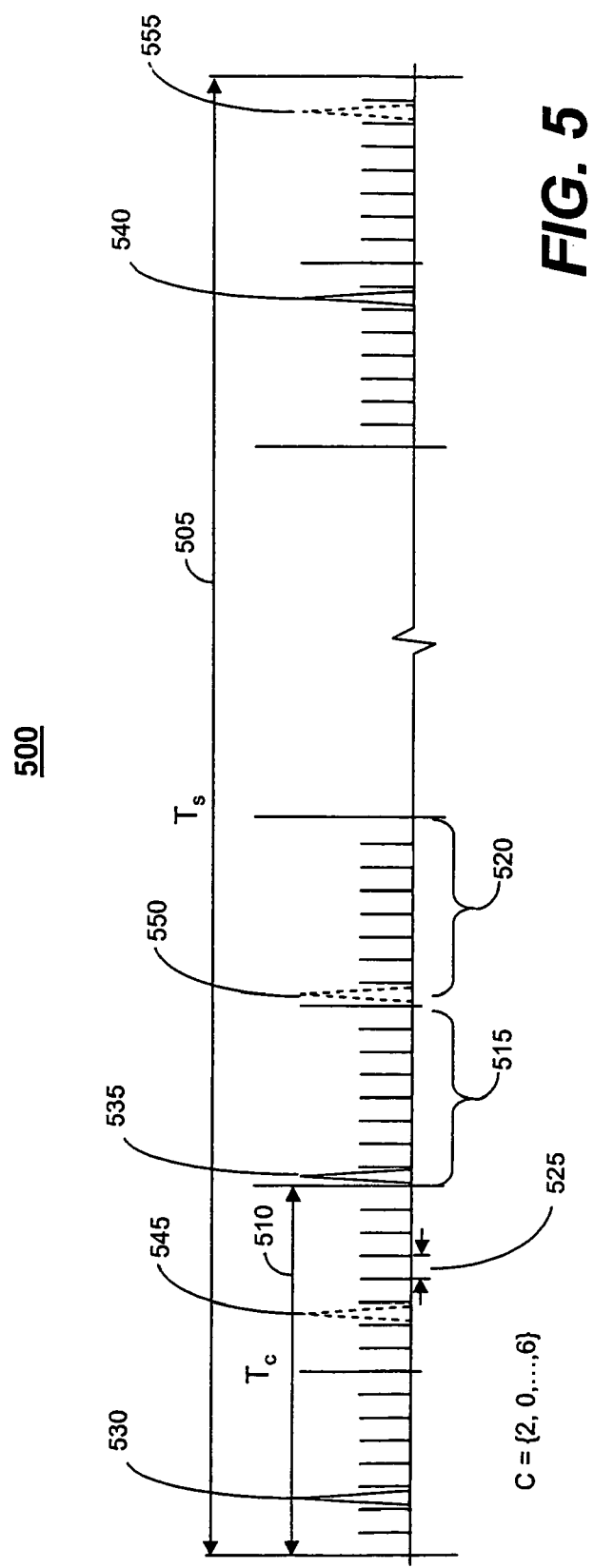
FIG. 5 is an illustrative example of a binary VSPPM signal.

FIG. 5 is an illustration of a Variable Spacing Pulse Position Modulation (VSPPM) signal 500 for the special case when M=1 (binary PPM). The binary VSPPM signal 500 contains a number of symbols 505 with a symbol period $T_s$. However, because M=1, the only possible symbol values are 0 and 1. Each chip 510 is divided into only two sub-chips, a lower sub-chip 515 and an upper sub-chip 520. Each sub-chip is divided into $N_p$ time slots 525. When the value of the binary bit is −1 (binary "0"), a pulse is placed in the lower sub-chip 515. Conversely, when the value of the binary bit is +1, a pulse is placed in the upper sub-chip 520. Each pulse is then shifted to a time slot 525 within either the lower sub-chip 515 or the upper sub-chip 520 depending on the value of the corresponding value of the time hopping code sequence.

In the illustration, the time hopping code sequence is given by $c=\{2, 0, 5, 6, 7, 1, 4, 6\}$. Therefore, pulses 530, 535, and 540 represent a binary bit with the value −1. Because the value of the binary bit is −1, the pulses 530, 535, and 540 are placed in the lower sub-chip 515 of each chip 510 in the symbol. Additionally, each pulse is variably spaced within each lower sub-chip 515 by applying the time hopping code sequence. Thus, the pulse in the first chip would be placed in the third time slot, the pulse in the second chip would be placed in the first time slot, and so on. Similarly, pulses in a symbol that represents a binary bit +1 would be placed in the upper sub-chip 520 of each chip and encoded in the same manner. Pulses 545, 550, and 555 represent the signal that would be transmitted if the value of the binary bit transmitted during a symbol is +1.

In binary VSPPM, a pulse is transmitted during either the first half of the chip to denote a −1 or the second half of the chip to denote a +1, or vice versa. Two hopping sequences, which designate the time hopping patterns for each half chip, can be assigned to one user for the transmission of either the value −1 or +1. For the special case where sequences for the first and second time hopping codes are the same, the performance of the VSPPM scheme can be easily shown to outperform conventional PPM scheme. As an example, consider the throughput assuming single user performance with the same amount of gain. In order to avoid inter-pulse interference for conventional PPM, the PPM modulator shift of one-half the time-slot duration must be greater than the delay spread, $\tau_{ds}$. Hence, a pulse is transmitted no faster than once every $T_c=N_p*T_p=2*N_p*\tau_{ds}$ seconds. In VSPPM, the PPM modulator shift, $N_p*T_p/2$, must exceed the delay spread. Hence, a pulse is transmitted no faster than once every $T_c=N_p*T_p=2*\tau_{ds}$. Thus, the VSPPM scheme results in a $N_p$ fold reduction in the symbol period, which results in an $N_p$ fold improvement in throughput. For the same chip period, the signal separation of the VSPPM scheme is $N_p$ times larger then in conventional PPM, which results in the system being much more resilient to fading and interference.

Figure 6:
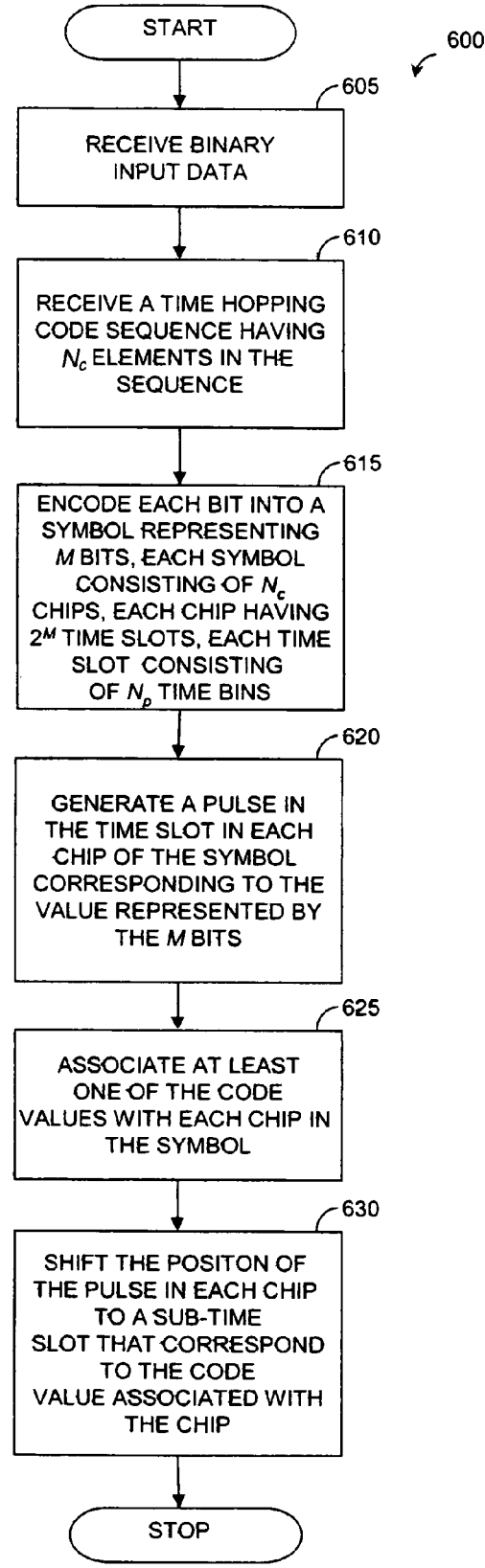
FIG. 6 is a logic flow diagram of an exemplary method for creating a VSPPM UWB signal.

FIG. 6 is a logic flow diagram illustrating an exemplary routine 600 for generating a VSPPM spread spectrum signal. The routine 600 begins at 605, in which the binary input data, which consists of a stream of information bits, is received. Each information bit has amplitude equal to −1 (corresponding to binary "0") or +1 (corresponding to binary "1"). At 610 at least one time hopping code sequence, consisting of $N_c$ elements is received by the transmitter.

Next, at 615, every M bits are encoded into a symbol, which has a symbol value equal to the binary value of the M binary bits that is in the range of 0 to $(2^M-1)$. Each symbol consists of $N_c$ spreading chips, which are divided into $2^M$ sub-chips that correspond to the possible symbol values. Each chip is encoded with a time hopping code sequence that further divides each sub-chip into $N_p$ time slots, where each element in the time hopping code sequence ranges from 0 to $N_p-1$. Each time slot corresponds to at least one value of the time hopping code sequence. For example, given time hopping code having eight elements, $c=\{c_1, c_2, c_3, c_4, c_5, c_6, c_7, c_8\}$, where each time hopping code element, $c_i$ takes the values 0 to 3, the first time slot corresponds to the time hopping code value 0, the second time slot corresponds to the time hopping code value 1, and so on up to the fourth time slot, which corresponds to the time hopping code value 3.

At 620 a pulse is generated in the time slot of each chip in the symbol that corresponds to the symbol value representing the M binary bits. Next, at 625, each time-hopping code value is associated with at least one chip. Thus, for the time hopping code c, the value $c_1$ is associated with the first chip, the value $c_2$ is associated with the second chip, $c_3$ is associated with the third chip, and so forth. Lastly, at 630, the pulse in each sub-chip is shifted in time to the appropriate time slot that corresponds to the time-hopping code value associated with that particular chip.

Other alternative embodiments will become apparent to those skilled in the art of which an exemplary embodiment pertains without departing from its spirit and scope. Accordingly, the scope of the present invention is defined by the appended claims rather than the foregoing description.

We claim:

1. A method for modulating a communications signal across a communications channel, comprising:
   receiving the communications signal including a plurality of input data bits, each input data bit having a first value or a second value;
   receiving at least one time hopping code sequence comprising $N_c$ elements, each element having a code value;
   encoding each set of M input data bits into a symbol having a symbol value in the range of 0 to $(2^M-1)$, the symbol comprising $N_c$ chips, each chip consisting of $2^M$ sub-chips, wherein each of the $2^M$ sub-chips comprises $N_p$ time slots; generating a pulse in one of the $2^M$ sub-chips that corresponds to the symbol value;
   associating the at least one time hopping code sequence with each symbol value;
   associating each code value in the at least one time hopping code sequence with at least one chip in the symbol; and
   shifting the position of the pulse within the sub-chip in each chip to at least one of the $N_p$ time slots, wherein the time slot corresponds to the code value associated with that chip.

2. The method of claim 1, wherein receiving at least one time hopping code sequence comprises:
   receiving $2^M$ time hopping code sequences, each comprising $N_c$ elements, and each element having a code value in the range of 0 to $(N_p-1)$;
   associating at least one time hopping code sequence of the $2^M$ time hopping code sequences with the symbol value; and
   applying the at least one time hopping code sequence with the symbol value to each symbol having a particular symbol value.

3. The method of claim 1, wherein the at least one time hopping code sequence is a pseudorandom sequence.

4. The method of claim 1, wherein the at least one time hopping code sequence is an orthogonal sequence.

5. The method of claim 1, wherein the value of M is 3.

6. The method of claim 1, wherein the communications channel is a wireless radio channel.

7. An ultra-wideband (UWB) transmitter operable for transmitting a pulse position spread spectrum signal over a communications channel, comprising:
   a spread spectrum encoder operable for:
      receiving at least one time hopping code sequence comprising $N_c$ elements, each element consisting of a code value;
      receiving a signal including a plurality of input data bits comprising a plurality of binary bits;
      applying the at least one time hopping code sequence to encode M binary bits into symbols with values in the range of 0 to $(2^M-1)$, each symbol consisting of a number of predefined chips, $N_c$, each chip consisting of $2^M$ sub-chips, and each sub-chip consisting of $N_p$ time slots;
      associating the at least one time hopping code sequence with each symbol value; and
      associating at least one code value with each sub-chip in each chip in the symbol;
   a time-hopping code generator connected to the spread spectrum encoder for generating the least one time hopping code sequence;
   a pulse generator for generating a plurality of pulses; and
   a pulse position modulator for modulating the encoded symbols with the plurality of pulses generated by the pulse generator; and
   a transmission unit for transmitting the symbols from the spread spectrum encoder as the pulse position spread spectrum signal.

8. The transmitter of claim 7, wherein modulating the encoded symbols with the plurality of pulses generated by the pulse generator, comprises:
   placing a pulse in one of the sub-chips in each chip of a symbol, where the sub-chip corresponds to a particular symbol value; and
   shifting the position of the pulse within a sub-chip to a time slot corresponding to the code value associated with a particular chip.

9. The transmitter of claim 7, wherein only one time hopping code sequence is applied to encode the M binary bits into a symbol.

10. The transmitter of claim 7, wherein the time hopping code sequences are pseudorandom code sequences.

11. The transmitter of claim 7, wherein the time hopping code sequences are orthogonal sequences.

12. The transmitter of claim 7, wherein the value of M is 3.

13. The transmitter of claim 7, further comprising an antenna for applying the pulse position spread spectrum signal to the communications channel.

14. The transmitter of claim 7, wherein the communications channel is a wireless radio channel.

* * * * *